United States Patent [19]

Shimoda

[11] Patent Number: 5,312,906

[45] Date of Patent: May 17, 1994

[54] OPTICAL INFORMATION RECORDING MEDIA AND BISAZO COMPOUNDS FOR USE THEREIN

[75] Inventor: Masakatsu Shimoda, Tokyo, Japan

[73] Assignee: Ricoh Company, Ltd., Tokyo, Japan

[21] Appl. No.: 919,593

[22] Filed: Jul. 24, 1992

[30] Foreign Application Priority Data

Jul. 25, 1991 [JP] Japan ................. 3-186306
Aug. 2, 1991 [JP] Japan ................. 3-194166

[51] Int. Cl.$^5$ .......................................... C09B 35/021
[52] U.S. Cl. ..................... 534/653; 534/561;
534/688; 534/759; 534/829; 534/830; 534/831;
534/835
[58] Field of Search ............... 534/561, 653, 688, 759,
534/829, 830, 831, 835

[56] References Cited

U.S. PATENT DOCUMENTS

| 4,582,771 | 5/1986 | Ohta | 534/759 X |
| 4,663,442 | 5/1987 | Ohta | 534/829 X |
| 4,743,523 | 5/1988 | Yamashita et al. | 534/830 X |
| 4,868,080 | 9/1989 | Umehara et al. | 430/73 |

FOREIGN PATENT DOCUMENTS 62-118353  5/1987  Japan ................. 534/830

OTHER PUBLICATIONS

Ota, Chemical Abstracts, 108:46819a (1988).

Primary Examiner—Mary C. Lee
Assistant Examiner—Fiona T. Powers
Attorney, Agent, or Firm—Cooper & Dunham

[57] ABSTRACT

Bisazo compounds of formula (I), an intermediate for producing the bisazo compound of formula (I), and trisazo compounds of formula (II) for use in optical information recording media, and methods of producing these compounds are disclosed:

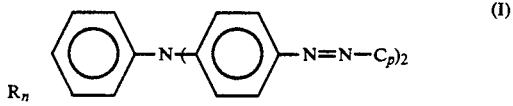

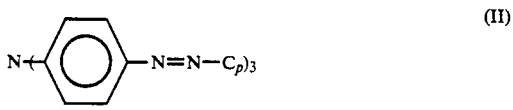

wherein R represents hydrogen, an alkyl group having 1 to 20 carbon atoms; an aryl group selected from the group consisting of phenyl group, naphthyl group, mesityl group, and tri-t-butyl phenyl group; an alkoxyl group having 1 to 4 carbon atoms; a nitro group; a cyano group; chlorine; or bromine; n is an integer of 1, 2, or 3; and $C_p$ represents a coupler residue.

1 Claim, 5 Drawing Sheets

OPTICAL INFORMATION RECORDING MEDIA AND BISAZO COMPOUNDS FOR USE THEREIN

BACKGROUND OF THE INVENTION

1. Field of the Invention

The present invention relates to bisazo and trisazo compounds for use in optical information recording media, a bis(diazonium) salt which is an intermediate for producing the bisazo compound, and methods of producing the same.

2. Discussion of Background

Development of an optical disc recording apparatus, as means for recording information with high recording density, has recently become very active. Optical information recording media, which are used for the optical recording apparatus, have feature that the recording media are not easily worn out, because writing and reading are performed by a non-contact operation with a thermal head, and moreover recording can be carried out with high density. Development of various kinds of optical information recording media is also in progress.

Among such optical recording media, development of a heat-mode recording medium is particularly active. The heat-mode optical information recording medium utilizes recording light by conversion of the light to the thermal energy. A pit-formation type optical information recording medium is an example of the above-mentioned heat-mode recording medium. More specifically, in the pit-formation type recording medium, a portion of the optical information recording medium is melted by the application of recording light course such as a laser beam thereto, and the melted portion is removed, whereby small holes called pits are formed on the recording medium in the writing operation. Information is recorded by formations of pit, and the information is read by detecting the pits under application of reading or reproduction light.

A variety of other optical information recording media such as an optical information recording medium utilizing phase changes and an optical information recording medium utilizing photochromic materials have been proposed.

An optical information recording medium is required for the efficient absorption of light energy applied by a laser beam. Therefore, it is necessary to employ an optical information recording medium with high absorbance with respect to a laser beam with a specific wavelength for information recording. It is also necessary that the recording medium have high reflectance to a laser beam with a specific wavelength in order to accurately reproduce recorded information.

Most of conventional pit-formation type optical information recording media comprise materials based on the main components inorganic materials such as Se and Te. However, it is reported that recording media comprising an organic material consisting essentially of an organic dye in a recording layer are recently used more than the recording media based on inorganic materials. This is because there are environmental pollution problems with the inorganic materials and recording media with high sensitivity are required.

Examples of the organic dyes used for recording media are cyanine dyes (disclosed, for example, in Japanese Laid-Open Patent Application 58-114989), metal complexes (disclosed, for example, in Japanese Laid-Open Patent Application 58-16888), and phthalocyanine dyes (disclosed, for example, in Japanese Laid-Open Patent Applications 3-43461 and 3-77840).

Some of these dyes employed in the optical information recording media are satisfactory with respect to the absorption wavelength when a semiconductor laser is used. However, the above dyes are unstable for oxygen and humidity when preserved in contact with air, the solubilities of these dyes are low, and the sensitivities of the recording media using these dyes are also low. Thus, satisfactory organic dyes for use in optical information recording media are still few.

SUMMARY OF THE INVENTION

It is therefore a first object of the present invention to provide a novel bisazo compound with high solubility, a high molecular extinction coefficient, and an improved reflectance, which is useful as a material to be contained in optical information recording media.

A second object of the present invention is to provide a bis(diazonium) salt serving as an intermediate for producing the above-mentioned bisazo compound.

A third object of the present invention is to provide a method of producing the above-mentioned bisazo compound.

A fourth object of the present invention is to provide a method of producing the above-mentioned bis(diazonium) salt.

A fifth object of the present invention is to provide a novel trisazo compound with high stability, a high molecular extinction coefficient, and an improved reflectance which is useful as a material to be contained in optical information recording media.

A sixth object of the present invention is to provide a method of producing the above-mentioned trisazo compound.

The first object of the present invention is achieved by bisazo compounds of formula (I):

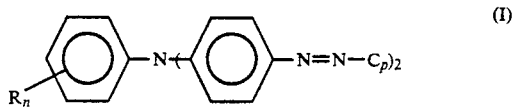

wherein R represents hydrogen; an alkyl group having 1 to 20 carbon atoms, an aryl group selected from the group consisting of phenyl group, naphthyl group, mesityl group, and tri-t-butyl phenyl group; an alkoxyl group having 1 to 4 carbon atoms; a nitro group; a cyano group; chlorine; or bromine; n is an integer of 1, 2, or 3; and $C_p$ represents a coupler residue.

The second object of the present invention is achieved by bis(diazonium) salt of formula (II):

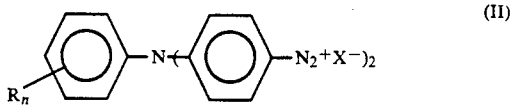

wherein R represents hydrogen, an alkyl group having 1 to 20 carbon atoms; an aryl group selected from the group consisting of phenyl group, naphthyl group, mesityl group, and tri-t-butyl phenyl group; an alkoxyl group having 1 to 4 carbon atoms; a nitro group, a cyano group; chlorine; or bromine; n is an integer of 1, 2, or 3; and $X^-$ represents an anionic functional group.

The third object of the present invention is achieved by a method of producing the bisazo compound of the formula (I) comprising the step of allowing a bis(diazonium) salt of the formula (II) to react with a coupler.

The fourth object of the present invention is achieved by a method of producing a bis(diazonium) salt of the formula (II) comprising the step of subjecting a diamino compound of formula (III) to diazotisation:

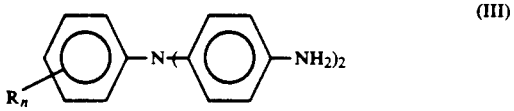
(III)

wherein R represents hydrogen; an alkyl group having 1 to 20 carbon atoms; an aryl group selected from the group consisting of phenyl group, naphthyl group, mesityl group, and tri-t-butyl phenyl group; an alkoxyl group having 1 to 4 carbon atoms; a nitro group; a cyano group; chlorine; or bromine; n is an integer of 1, 2, or 3; and $X^-$ represents an anionic functional group.

The fifth object of the present invention is achieved by a trisazo compounds of formula (IV):

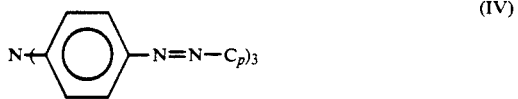
(IV)

wherein $C_p$ represents a coupler residue.

The sixth object of the present invention is achieved by a method of producing the trisazo compound of the formula (IV) comprising the steps of:

subjecting a triamine compound of formula (V) to diazotisation to produce a tris(diazonium) salt of formula (VI):

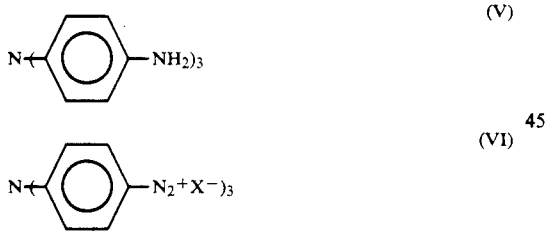
(V)

(VI)

wherein $X^-$ represents an anionic functional group, and allowing the tris(diazonium) salt of formula (VI) to react with a coupler of formula (VII) to carry out a coupling reaction therebetween:

H—$C_p$   (VII)

wherein $C_p$ represents a coupler residue.

BRIEF EXPLANATION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
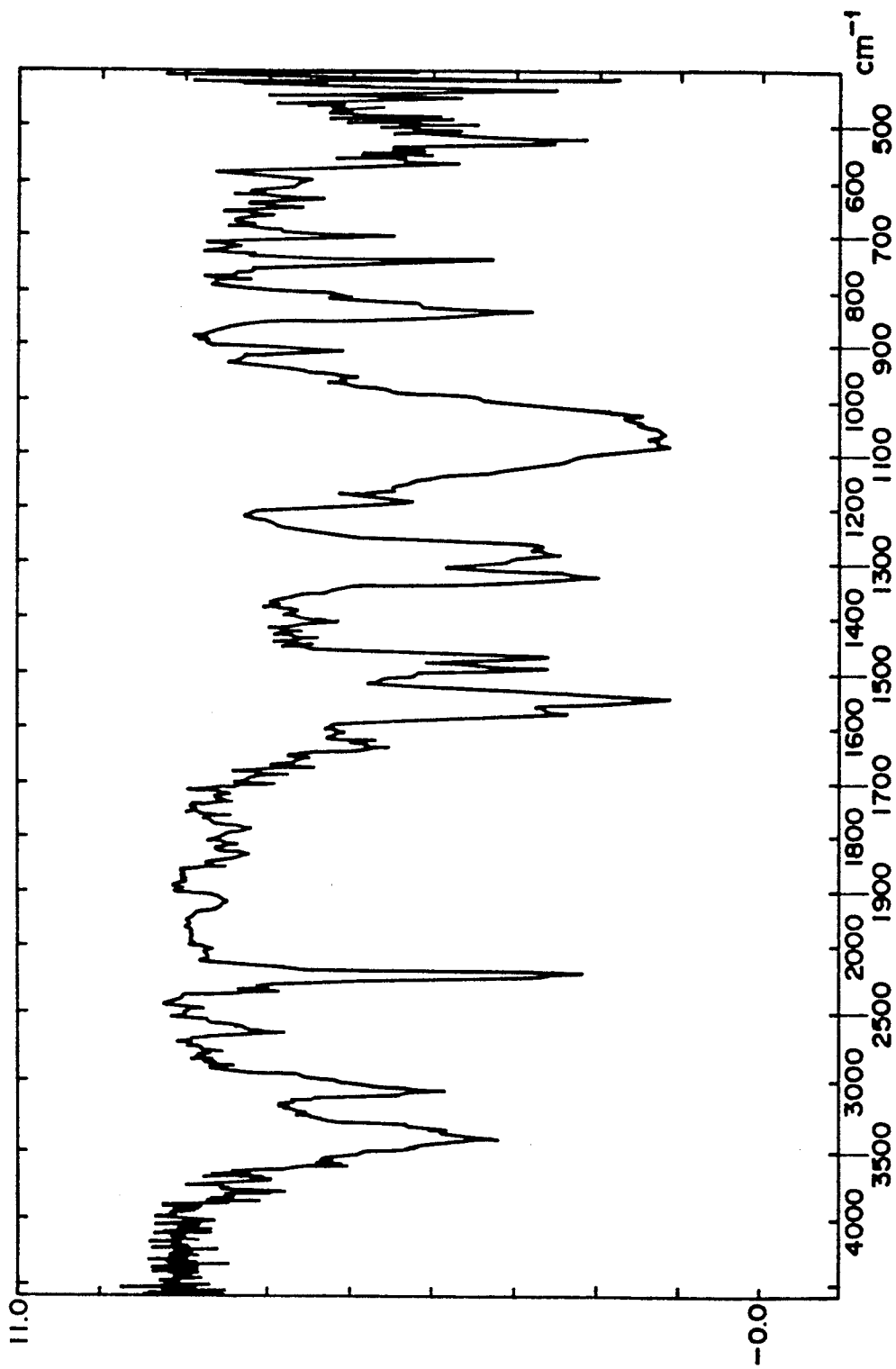
FIG. 1 is a chart of an infrared spectrum (KBr) of a bis(diazonium) salt of the present invention obtained in Example I-1, which is an intermediate employed for the producing a bisazo compound of the present invention.

Bisazo compounds according to the present invention of formula (I) can be prepared by a coupling reaction between a bis(diazonium) salt according to the present invention represented by formula (II) and a coupler:

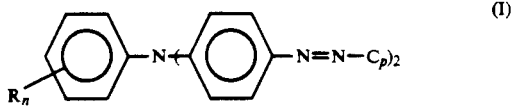
(I)

wherein R represents hydrogen, an alkyl group having 1 to 20 carbon atoms, an aryl group selected from the group consisting of phenyl group, naphthyl group, mesityl group, and tri-t-butyl phenyl group, an alkoxyl group having 1 to 4 carbon atoms, a nitro group, a cyano group, chlorine, or bromine; n is an integer of 1, 2, or 3; and $C_p$ represents a coupler residue:

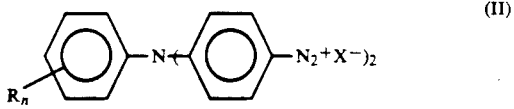
(II)

wherein R and n are respectively the same as defined in formula (I), and $X^-$ represents an anionic functional group.

The bis(diazonium) salt of the present invention represented by the above-mentioned formula (II) can be obtained by diazotisation of a diamino compound represented by formula (III):

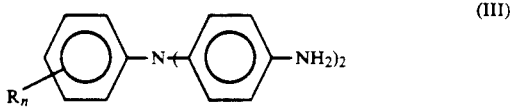
(III)

wherein R and n are respectively the same as defined in formula (I).

Examples of the alkyl group represented by R in formula (I) are methyl group, ethyl group, n-propyl group, isopropyl group, n-butyl group, s-butyl group, t-butyl group, n-pentyl group, and neopentyl group. The alkyl group represented by R may have a phenyl group as a substituent.

Examples of the aryl group represented by R are phenyl group, and naphthyl group; substituted aryl groups such as mesityl group and tri-t-butyl phenyl group.

Examples of the alkoxyl group represented by R are methoxy group, ethoxy group, n-propoxy group, isopropoxy group, n-butyloxy group, s-butyloxy group, and t-butyloxy group.

Representative examples of the anionic functional group represented by $X^-$ of formula (II) include $Cl^-$, $Br^-$, $I^-$, $BF_4^-$, $PF_6^-$, $B(C_6H_5)_4^-$, $ClO_4^-$, $SO_4^{2-}$,

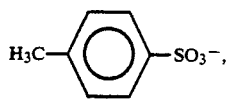

AsF$_6^-$, and SbF$_6^-$.

Among the above, it is preferable to employ BF$_4^-$ as the anionic functional group for use in the present invention.

The methods of preparing the bisazo compounds of previously mentioned formula (I) and the bis(-diazonium) salt of formula (II) will now be explained.

A compound of formula (IV) is allowed to react with the hydrazine hydrate to obtain the diamino compound of the above-mentioned formula (III):

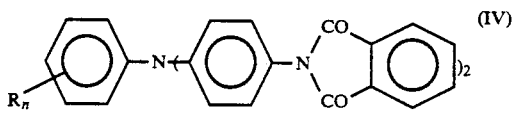

wherein R is the same as in the previously mentioned formula (I).

Subsequently, the thus obtained diamino compound is subjected to diazotisation, whereby bis(diazonium) salt of formula (II) according to the present invention is obtained.

The compound represented by the formula (IV) can be prepared by the so-called Ullmann reaction:

One equivalent of an amino compound represented by the following formula (V) is subjected to a condensation reaction with two equivalents of an iodine compound represented by the following formula (VI) with the addition of copper powder or copper halogenide, and a sufficient amount of alkali salt for neutralizing hydrogen iodide which is produced during the condensation reaction, in the presence or absence of a solvent under an inert gas atmosphere with the application of heat:

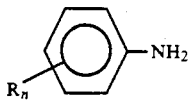

wherein R is the same as in the previously mentioned formula (I).

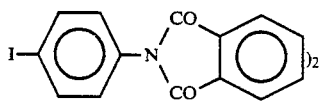

Thus, the diamino compound of formula (III) is obtained.

Examples of the alkali salt used in the above reaction are caustic soda, caustic potash, sodium carbonate, and potassium carbonate. Furthermore, nitrobenzene, dichlorobenzene, quinoline, N,N-dimethylformamide, dimethyl sulfoxide, N-methyl pyrrolidone, and 1,3-dimethyl-2-imidazolidinone can be used as the solvent in the above reaction.

The compound of the above-mentioned formula (IV) is dissolved in an organic solvent such as benzene, toluene, chloroform, 1,2-dichloroethane, acetone, tetrahydrofuran, or dioxane, with addition of surplus hydrazine hydrate. The reaction mixture is refluxed for 6 hours.

After the completion of the reaction, the solvent is distilled from the reaction mixture, and diamine compound of formula (V) is obtained. The thus obtained diamino compound can be purified by an appropriate method such as recrystallization or silica gel column chromatography.

The diazotisation of the thus obtained diamino compound is carried out by dispersing the diamino compound in an inorganic solvent such as hydrochloric acid or sulfuric acid, and then adding sodium nitrite thereto at a temperature in the range of −10° to 20° C., whereby bis(diazonium) salt of formula (II) can be obtained. The reaction completes within about 0.5 to 3 hours.

Furthermore, bis(diazonium) salt of formula (II) can be obtained by the addition of an aqueous solution of borofluoric acid or an aqueous solution of sodium borofluoride to the above reaction solvent for diazotisation to perform salt exchange.

Examples of the coupler for producing the bisazo compounds according to the present invention are as follows: acylaceto arylamide, phenol, pyridone, quinolone, pyrazole, indole, diphenylamine, aniline, aminopyridine, pyrimidine, pyrimidone, naphthol, naphthylamine, hydroxyanthracene, aminothiazole, thiophene, hydroxypyridine, and derivatives of the aforementioned compounds.

Further, these coupling components may be substituted by alkyl group, aryl group, hydroxyl group, amino group, alkylamino group, dialkylamino group, arylamino group, diarylamino group, hydroxyalkylamino group, halogen atom, alkoxyl group, aryloxy group, alkylaminocarbonyl group, arylaminocarbonyl group, alkyloxycarbonyl group, aryloxycarbonyl group, sulfonyl group, alkylaminosulfonyl group, arylaminosulfonyl group, alkylsulfonic group, arylsulfonic group, nitro group, or cyano group.

The coupling reaction of each bisazo compound according to the present invention can be carried out by isolating the previously obtained bis(diazonium) salt from the diazotisation reaction solvent, dissolving the bis(diazonium) salt in an organic solvent such as N,N-dimethylformamide, dimethyl sulfoxide, or 1,4-dioxane together with a coupler represented by the previously mentioned general formula (III), and adding dropwise an alkali aqueous solution such as an aqueous solution of sodium acetate thereto at a temperature in the range of −10° to 4° C. Each coupling reaction proceeds in about 5 minute to 3 hours.

After the reaction completed, each reaction mixture is poured onto ice, filtered to obtain crystals which separate out from the reaction mixture, and purified by an appropriate method such as recrystallization or silica gel column chromatography, so that each bisazo compounds according to the present invention can be obtained.

Moreover, it is also possible to produce the bisazo compounds according to the present invention with the addition of a coupler directly to the previously mentioned reaction solvent for diazotisation.

Examples of the bisazo compound according to the present invention prepared by the above-mentioned method are as follows:

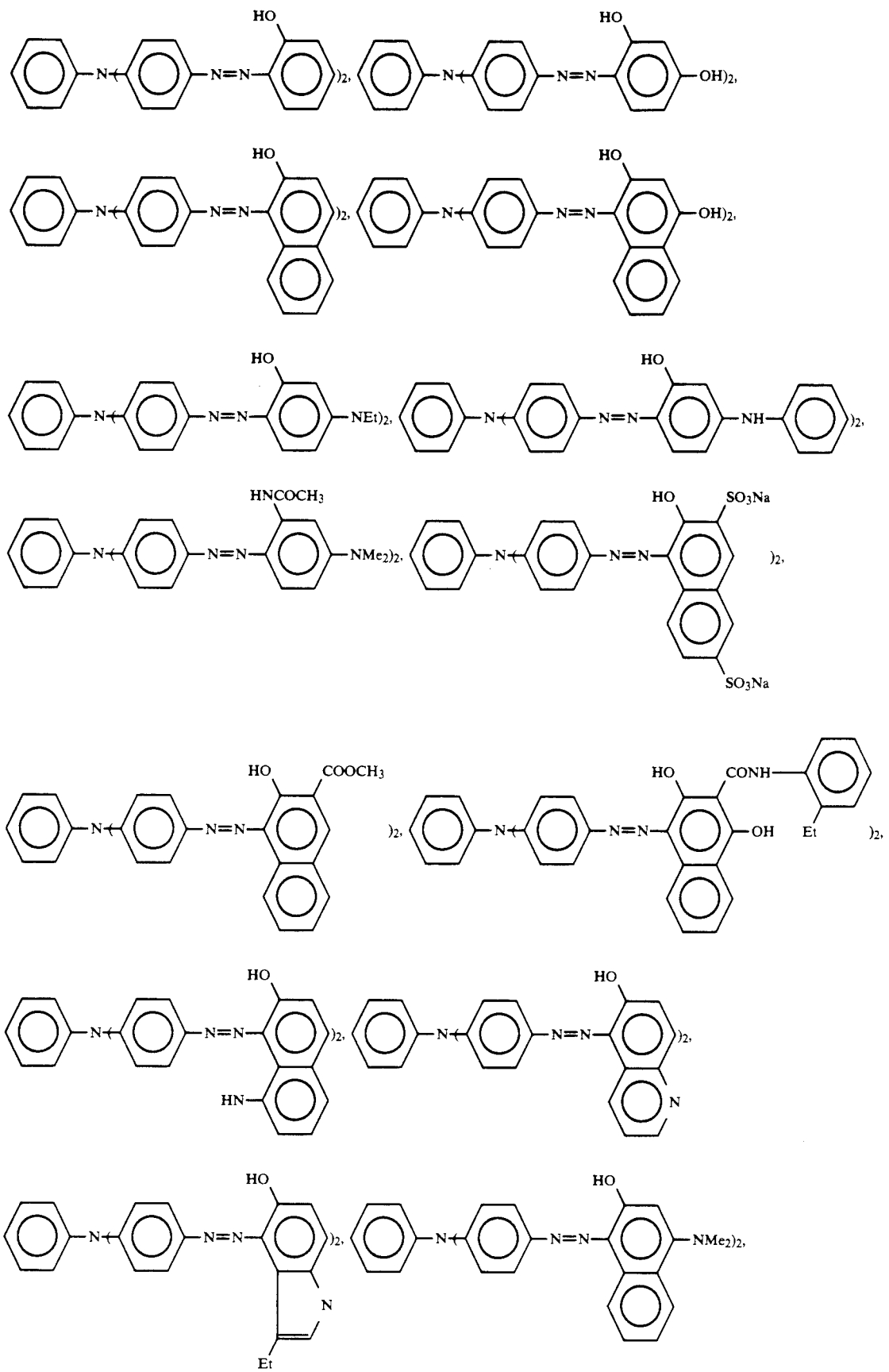

-continued
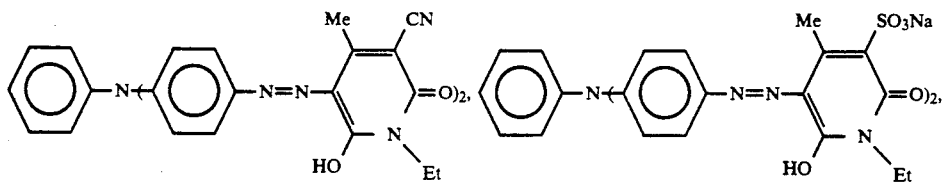
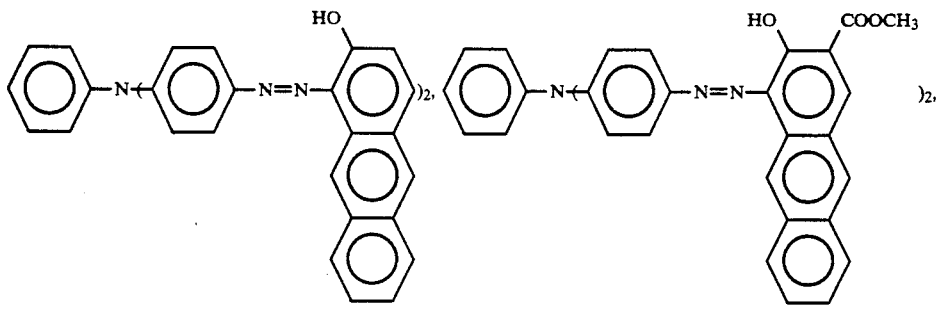
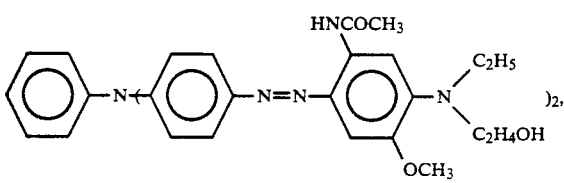
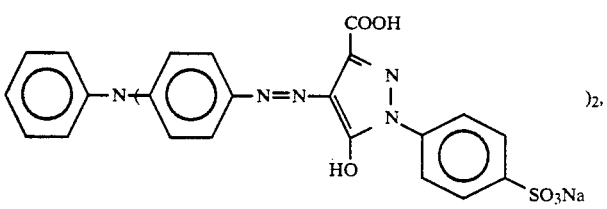
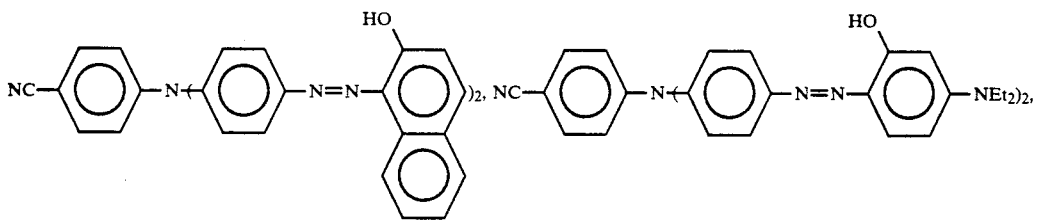
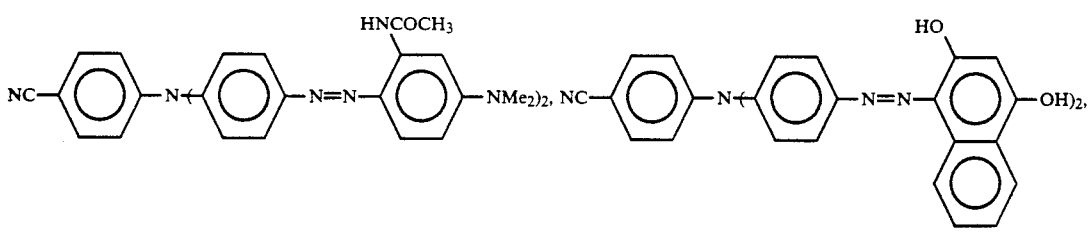
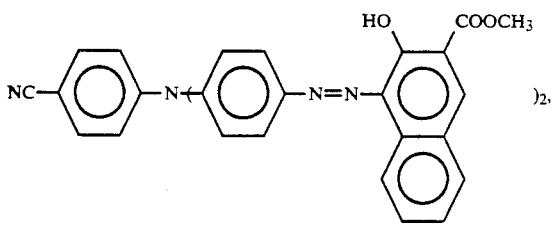

-continued
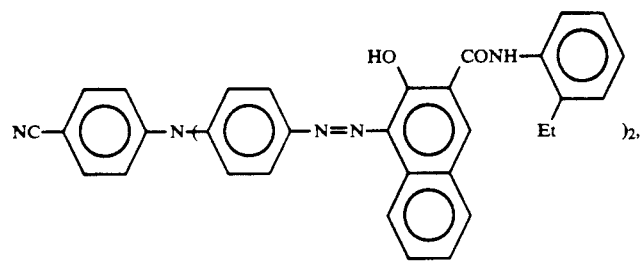
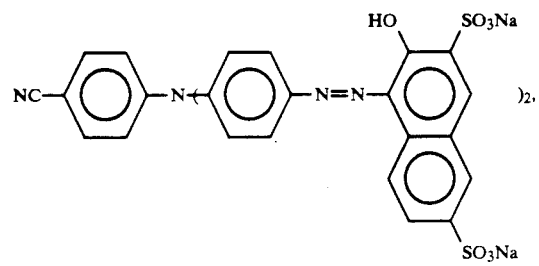
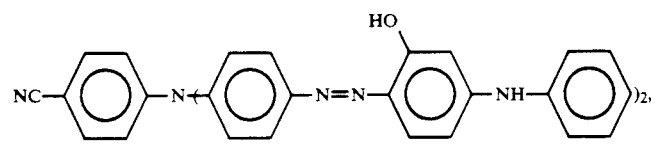
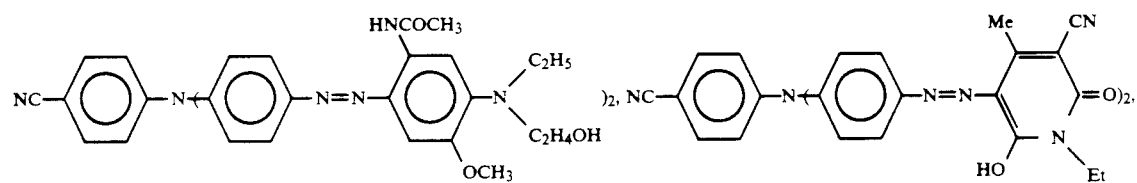
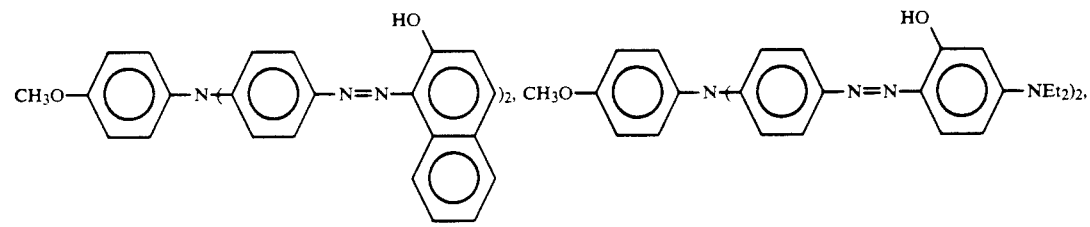
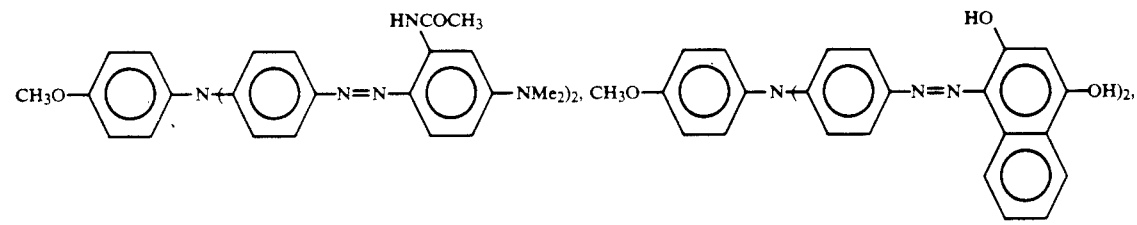
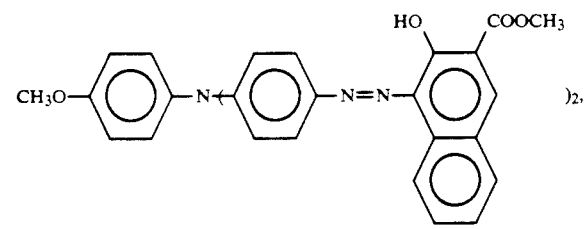

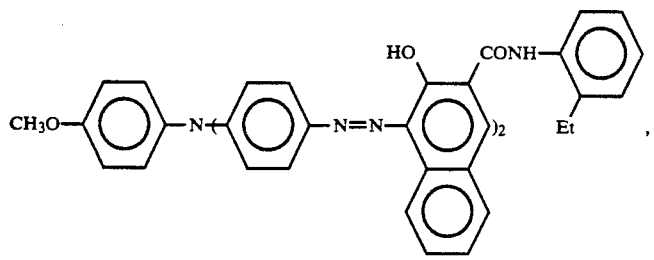
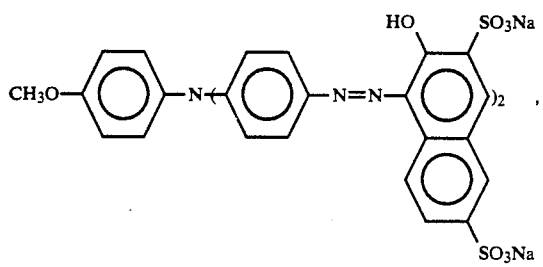
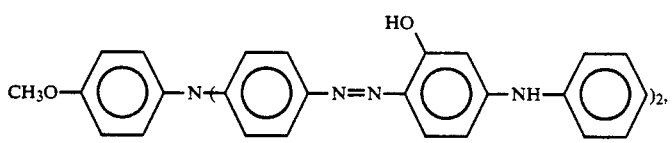
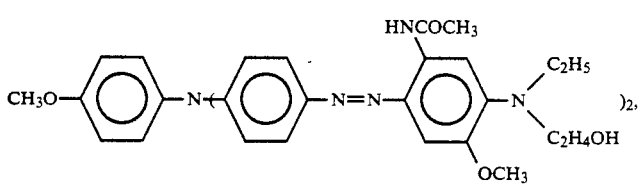
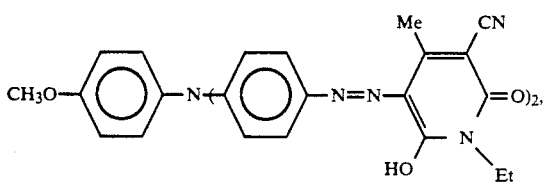
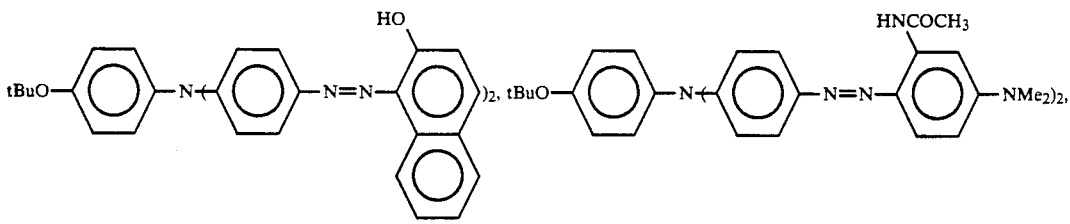
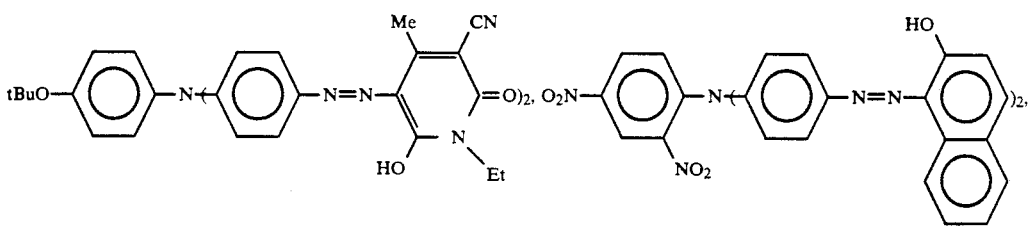
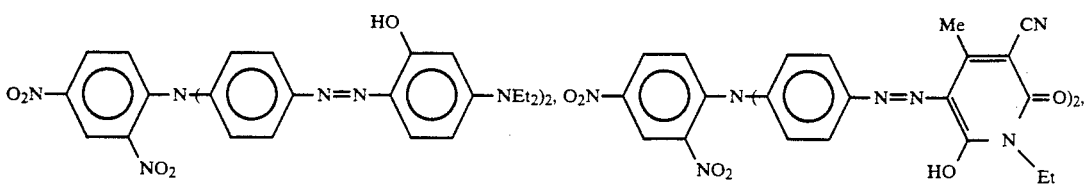

-continued
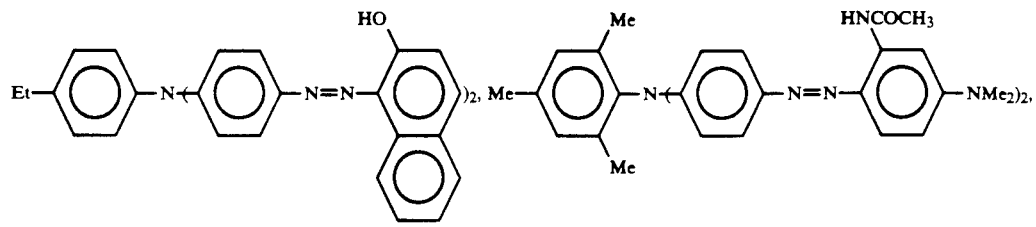
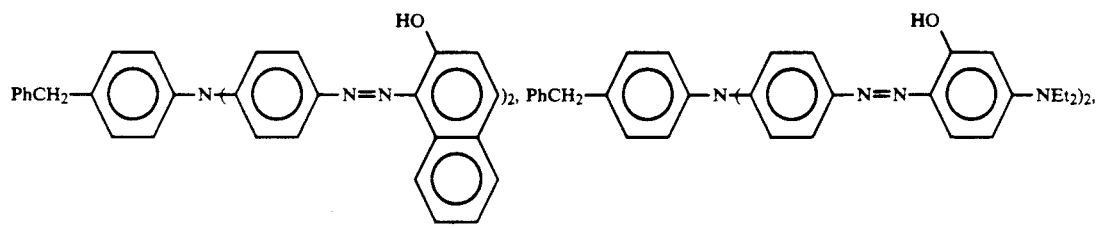
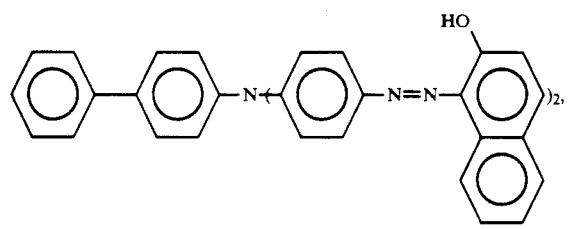
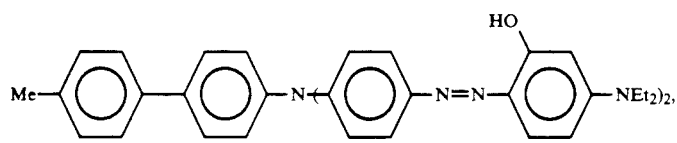
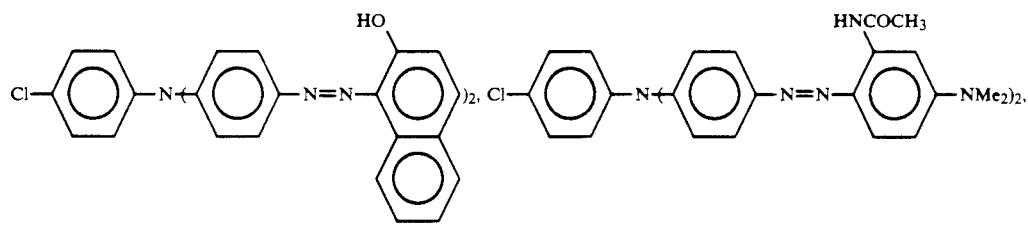
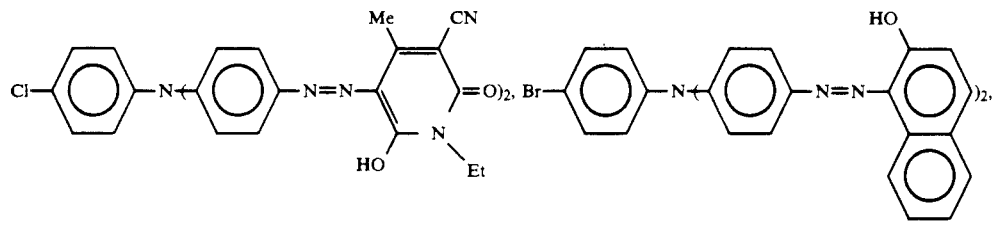
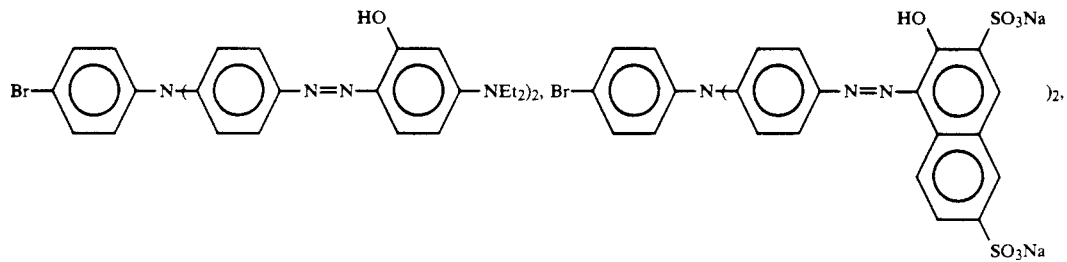

-continued

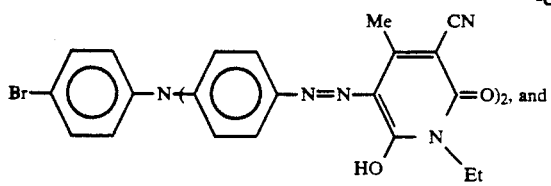, and 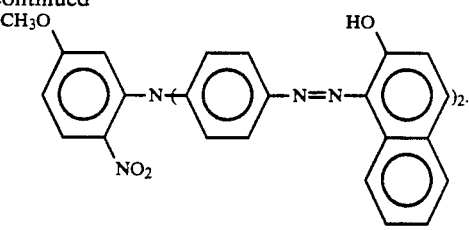.

Trisazo compounds of formula (VII) can be prepared by the following method:

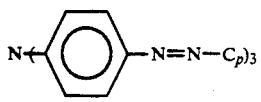 (VII)

wherein, $C_p$ represents a coupler residue.

A compound represented by the following formula (VIII) is subjected to diazotisation to produce a tris(diazonium) salt of formula (IX). Thereafter, a coupler represented by the following formula (IX) is coupled to diazotized compound for the coupling reaction:

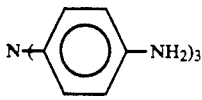 (VIII)

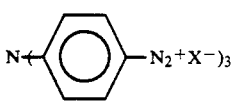 (IX)

wherein $X^-$ is an anionic functional group,

 (X)

wherein $C_p$ represents a coupler residue.

The compound represented by the above-mentioned formula (VIII) can be obtained by reduction of trinitrotriphenylamine represented by the following general formula (XI), which is obtained by the reaction between triphenylamine represented by the following formula (XI) and an excessive amount of nitric acid in acetic acid:

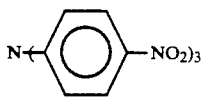 (XI)

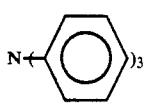 (XII)

For the reduction of trinitrotriphenylamine represented by the above-mentioned formula (XI), a hydrogenation method can be employed.

There are a system using a homogeneous catalyst and a system using a heterogeneous catalyst in the hydrogenation method. Examples of the homogeneous catalyst include metal complex compounds of VII group elements such as rhodium, ruthenium, iridium, and cobalt. Examples of the heterogeneous catalyst include platinum compounds, Raney nickel; and platinum, palladium, rhodium, and ruthenium which are supported by activated carbon, alumina, or barium sulfate. In the present invention, it is preferable to use heterogeneous catalysts since the heterogeneous catalysts are easy to treat after the reaction.

In a reaction system using a heterogeneous catalyst, the reaction system is closed, and a gaseous phase portion of the system is substituted by hydrogen gas with one atmosphere pressure, and the reaction mixture is vigorously stirred.

At the point where a stoichiometric quantity of hydrogen gas is absorbed, the absorption is terminated. This point is considered to be the completion point of the reaction. In this case, the reaction can generally be carried out at room temperature. However, when the absorbing speed of the hydrogen gas is slow, the temperature of the reaction may be increased.

Examples of the reaction solvent used for the above reaction are methanol, ethanol, propanol, tetrahydrofuran, dioxane, ethyl acetate, and N,N-dimethylformamide.

The diazotisation of the thus obtained triamino compound can be carried out by dispersing the triamino compound in an inorganic acid such as hydrochloric acid or sulfuric acid, followed by the addition of sodium nitrite at a temperature in the range of $-10°$ to $20°$ C., whereby a tris(diazonium) salt represented by the following formula (IX) can be obtained. The reaction completes within about 2 hours.

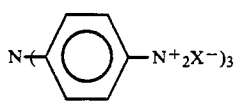 (IX)

wherein $X^-$ represents an anion functional group.

Further, the tris(diazonium) salt represented by the formula (IX) can also be obtained by the addition of an aqueous solution of borofluoric acid or an aqueous solution of sodium borofluoride to the above reaction solvent for diazotisation to perform salt exchange.

Examples of the coupler for producing the trisazo compounds according to the present invention are the same as those for producing the bisazo compounds, which are mentioned previously.

The coupling reaction of each trisazo compound according to the present invention can be carried out by isolating the previously obtained tris(diazonium) salt from the diazotisation reaction solvent, dissolving the tris(diazonium) salt in an organic solvent such as N,N-dimethylformamide, dimethyl sulfoxide, or 1,4-dioxane together with a coupler represented by the previously mentioned general formula (III), and adding dropwise an alkali aqueous solution such as an aqueous solution of sodium acetate thereto at a temperature in the range of −10° C. to 4° C. Each coupling reaction completes in about 5 minutes to 3 hours.

After the reaction, each reaction mixture is poured onto ice, filtered to obtain crystals which separate out from the reaction mixture, and purified by using an appropriate method such as recrystallization or silica gel column chromatography, so that each trisazo compound according to the present invention can be obtained.

Moreover, it is also possible to produce the trisazo compounds according to the present invention with the addition of a coupler directly to the previously mentioned reaction solvent for diazotisation.

Examples of the trisazo compound according to the present invention which are prepared by the previously mentioned method are as follows:

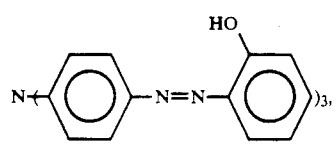

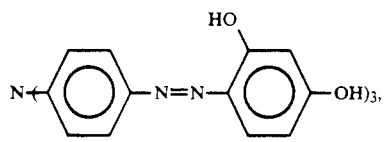

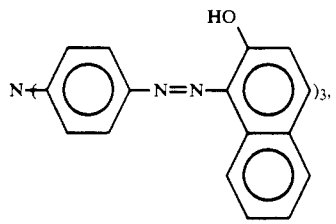

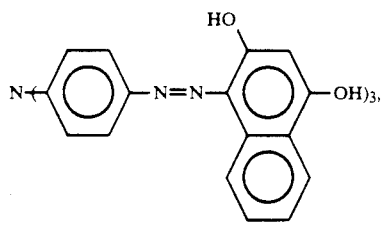

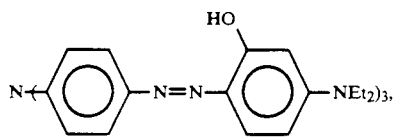

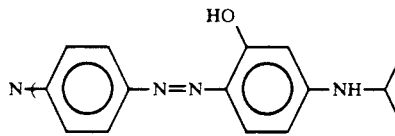

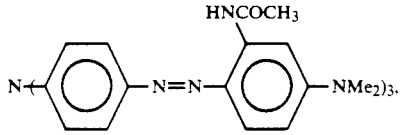

-continued

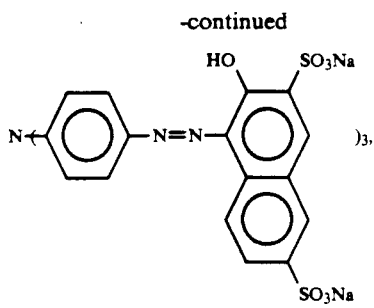

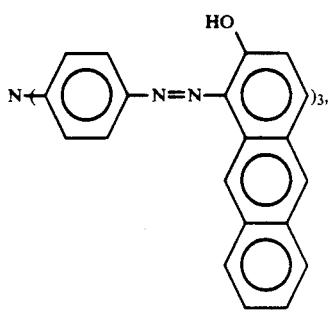

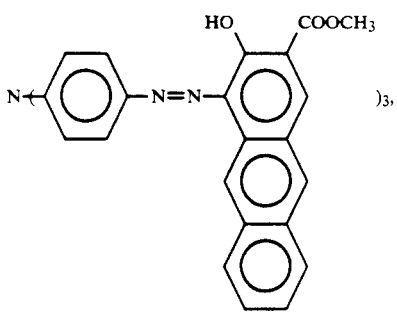

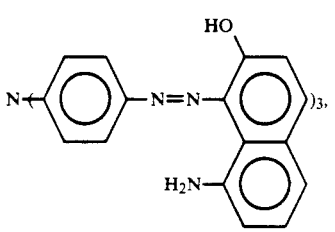

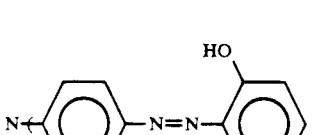

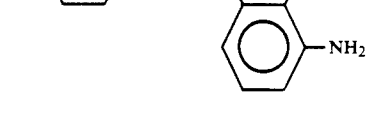

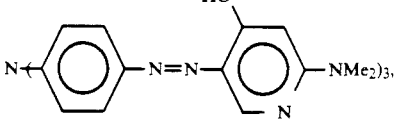

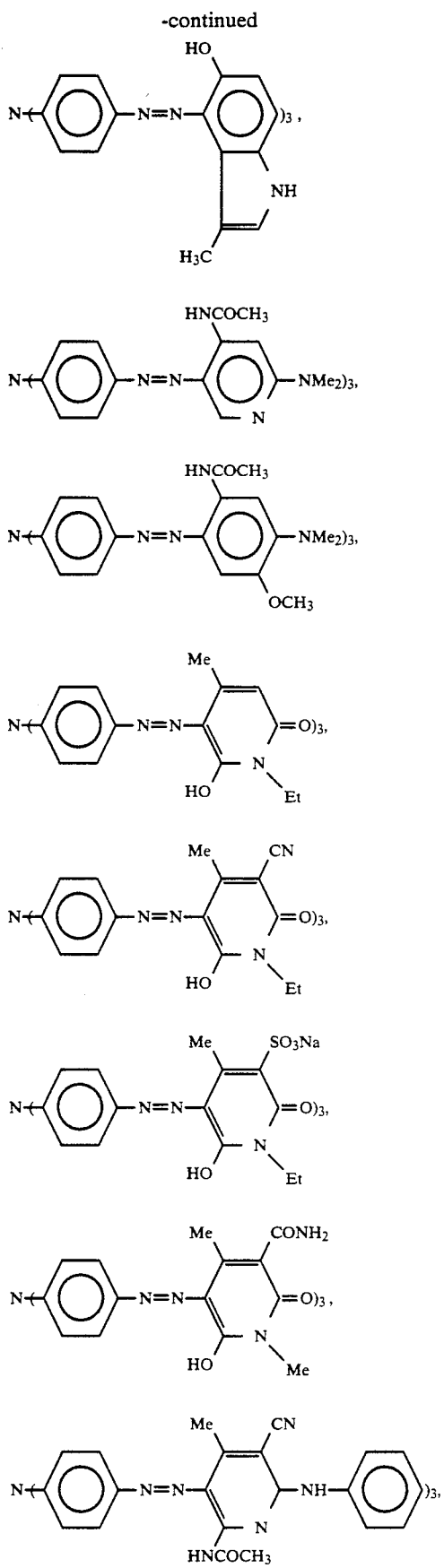
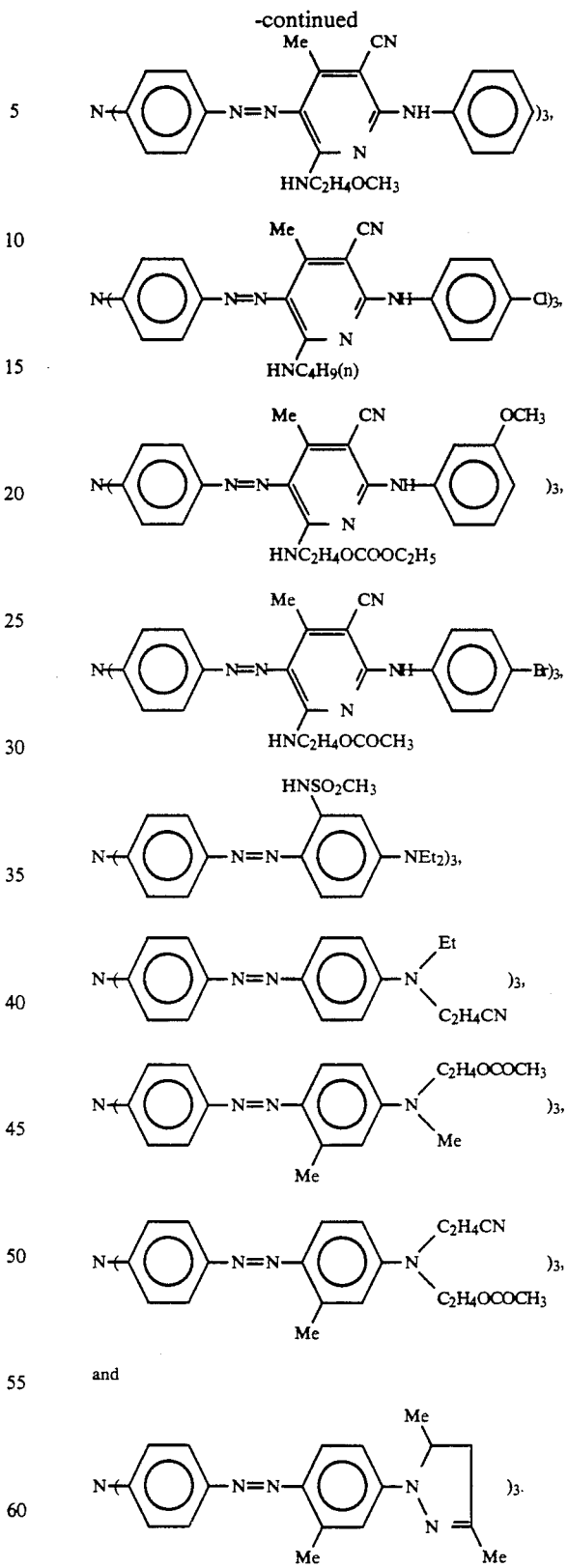
As mentioned previously, the above prepared bisazo compounds and trisazo compounds according to the present invention can be employed in a recording layer of optical information recording media comprising a substrate and the recording layer provided thereon.

The substrate of the optical information recording media can be made of any materials which are employed as the materials for the substrate of conventional optical information recording media. From the viewpoints of the optical characteristics, flatness, workability, handling properties, stability with time, and manufacturing cost, the following materials can be employed as the materials for the substrate: glass such as soda-lime glass; acrylic resins such as cellcast polymethyl methacrylate and injection-molded polymethyl methacrylate; vinyl chloride resins such as polyvinyl chloride, vinyl chloride copolymer; epoxy resin; polycarbonate resin; amorphous polyolefin; and polyester.

Among these materials, polymethyl methacrylate, polycarbonate resin, epoxy resin, amorphous polyolefin, polyester and glass can be preferably employed when the dimensional stability, transparency, and flatness of the recording media are taken into consideration. These materials can be worked into a substrate in the form of a film or a rigid plate.

When an optical information recording layer comprising the bisazo compound of formula (I) or the trisazo compound of formula (VII) is provided on the substrate, it is preferable that the thickness of the recording layer be in the range of 100 Å to 5 μm, more preferably in the range of 1000 Å to 3 μm. The recording layer can be prepared by the conventionally known thin film forming methods such as the sputtering method, the doctor blade method, the cast coating method, the spin coating method, and the dipping method.

Moreover, a binder resin can be used for the preparation of the recording layer, if necessary. As such binder resins, conventional materials, for example, polyvinyl alcohol (PVA), polyvinyl pyrrolidone (PVP), nitrocellulose, cellulose acetate, polyvinyl butyral, and polycarbonate can be used. It is preferable that the mixing ratio by weight of the bisazo compound or the trisazo compound of the present invention to the binder resin be 0.01 or so.

When the recording layer is prepared by the spin coating method, it is preferable that the number of rotation be in the range of 500 to 5000 rpm. When the spin coating method is employed, the recording layer may be heated or exposed to vapor of a solvent if necessary.

When the recording layer is formed by coating using the doctor blade method, the cast coating method, the spin coating method, or the dipping method, especially by the spin coating method, materials such as tetrachloroethane, bromoform, dibromoethane, ethyl cellosolve, xylene, chlorobenzene, chloroform, toluene, acetone, ethylenediamine, and pyridine can be used as the solvent for the coating.

The bisazo compound and trisazo compounds according to the present invention are excellent in solubility and have large molecular absorption coefficients and reflectances, so that they can be preferably employed not only in the optical information recording media, but also in inks, filters, optical shutters, photoelectric conversion devices, optical modulation devices, and space modulation devices.

EXAMPLE I-1

[Preparation of Bis(diazonium) salt]

85 g (0.026 mol) of N,N-bis(4'-aminophenyl-4-yl)-p-cyano aniline was added to diluted hydrochloric acid consisting of 50 ml of concentrated hydrochloric acid and 50 ml of water to obtain a mixture. The thus obtained mixture was stirred at 70° C. and then cooled to −5° C. Thereafter, a solution prepared by dissolving 3.96 g (0.057 mol) of sodium nitrite in 15 ml of water was added dropwise to the mixture at temperatures within −5° C. to −8° C. The mixture was stirred at the same temperatures for 2 hours to obtain a solution. To this solution, a solution obtained by dissolving 12.60 g (0.115 mol) of sodium boron tetrafluoride in 20 ml of water was added at the temperature between −2° C. to −5° C. The crystals separated out were filtered off and dried in the dark, so that 11.33 g of a bis(diazonium) salt of the present invention was obtained in a yield of 91%.

FIG. 1 shows an infrared spectrum (by use of KBr tablet) of the above obtained bis(diazonium) salt. An absorption characteristics of the stretching vibrations of the bis(diazonium) salt is observed at 2238 cm$^{-1}$ in the infrared spectrum.

EXAMPLE I-2

[Preparation of Bisazo Compound No. I-1]

1.88 g (0.013 mol) of β-naphthol was dissolved in 100 ml of dimethylformamide (DMF) to obtain a solution. To the thus obtained solution, 2.50 g (0.0050 mol) of the bis(diazonium) salt obtained in Example I-1 was added. To this reaction mixture, a solution prepared by dissolving 2.10 g of sodium acetate in 10 ml of water was added dropwise over 20 minutes at room temperature. The reaction mixture was stirred at the same temperature for 2 hours, and then poured onto ice. The reaction mixture was further stirred for one hour. Crystals separated out from the reaction mixture. The crystals were filtered off, recrystallized from 100 ml of toluene, and dried under reduced pressure with the application of heat thereto, whereby 1.84 g of a bisazo compound No. I-1 according to the present invention was obtained in the form of green powder in a yield of 60%.

Figure 2:
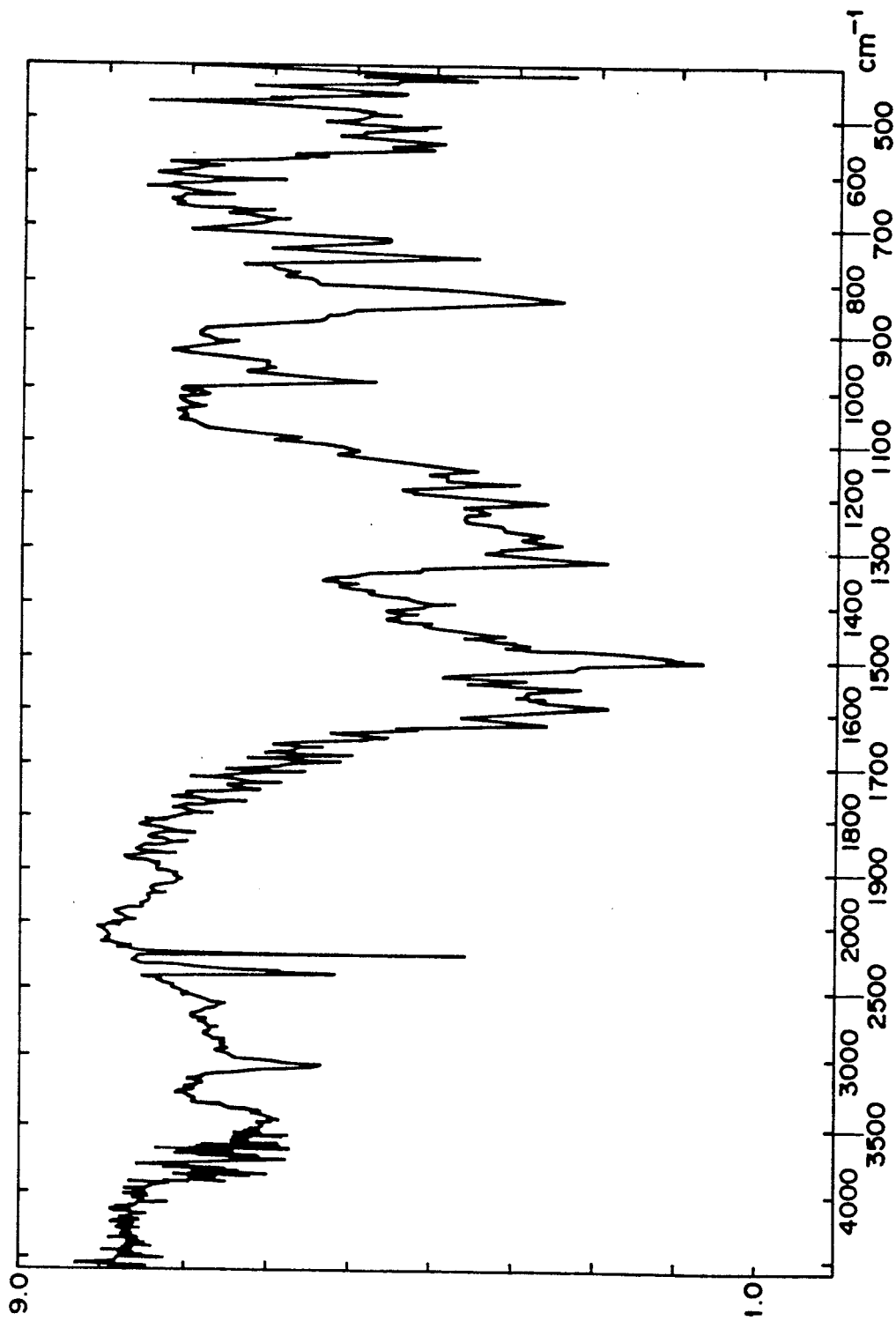
FIGS. 2 and 3 respectively are the charts of infrared spectrums (KBr) of bisazo compounds No. I-1 and No. I-2 according to the present invention.

FIG. 2 shows an infrared spectrum (by use of KBr tablet) of the above obtained bisazo compound No. I-1.

EXAMPLES I-3 to I-12

[Preparation of Bisazo Compounds No. I-2 to No. I-11]

The procedure for preparation of the bisazo compound in Example I-2 was repeated except that the coupler employed in Example I-2 was replaced by each of the couplers corresponding to the bisazo compounds No. I-2 to I-11, shown in Table 1, whereby bisazo compounds No. I-2 to No. I-11 according to the present invention were obtained. Table 1 shows the melting points or decomposition points of the thus obtained bisazo compounds. Table 2 shows the results the elemental analyses of these bisazo compounds. Table 3 shows the absorption maximum wavelength, and the molecular absorption coefficient of each of the thus obtained bisazo compounds.

Figure 3:
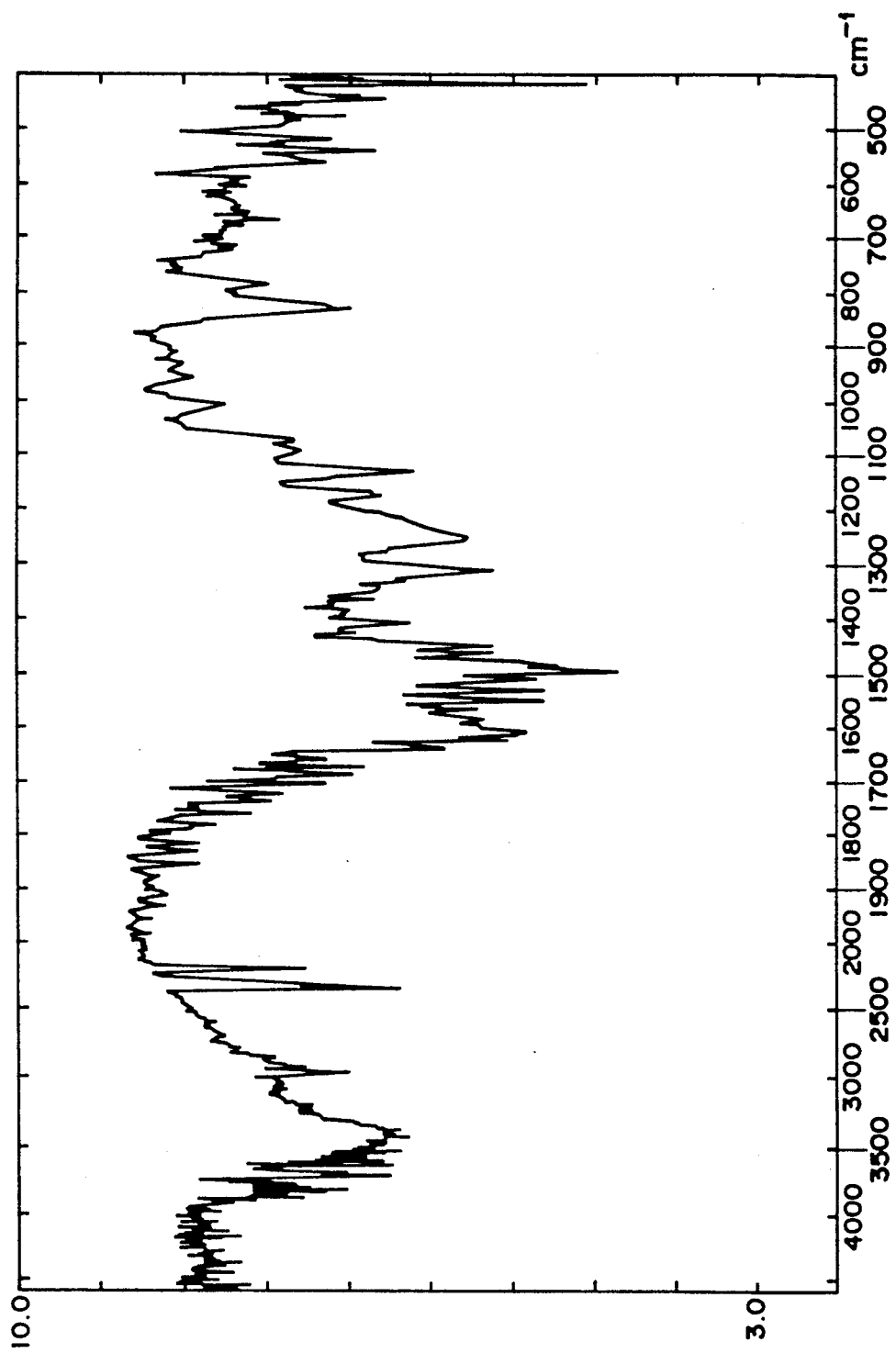

FIG. 3 shows an infrared spectrum (by use of KBr tablet) of the above obtained trisazo compound No. I-2.

EXAMPLE II-1

[Preparation of Tris(diazonium) salt]

80 ml of concentrated hydrochloric acid and 80 ml of water were added to 10.00 g (0.034 mol) of 4,4',4''-triaminotriphenylamine to obtain a mixture. The mixture was heated to 70° C. to prepare a 4,4',4''-triaminotriphenylamine hydrochloride. The solution was then cooled to −5° C. by ice-salt bath.

A solution prepared by dissolving 7.40 g (0.107 mol) of sodium nitrite in 20 ml of water was added dropwise to the above solution of the hydrochloride over 20 minutes, with the temperature of the reaction mixture maintained less than −5° C., so that a reaction mixture was obtained. The thus obtained reaction mixture was stirred for 3 hours at the same temperature as the above, followed by the addition of a solution which was obtained by dissolving 17.50 g (0.159 mol) of sodium fluoroborate in 25 ml of water dropwise at a temperature less than −5° C. The reaction mixture was further stirred for one hour with the temperature thereof maintained at 0° C. Yellow crystals separated out from the reaction mixture. The crystals were filtered off, washed with cold water, and dried at room temperature under reduced pressure in the dark, whereby 17.95 g of a tris(diazonium) salt according to the present invention was obtained in the form of yellow powder in a yield of 90%.

EXAMPLE II-2

[Preparation of Trisazo Compound No. II-1]

1.88 g (0.013 mol) of β-naphthol was dissolved in 100 ml of DMF to obtain a solution. To the thus obtained solution, 2.24 g (0.0038 mol) of the tris(diazonium) salt obtained in Example II-1 was added. To this reaction mixture, a solution prepared by dissolving 2.14 g of sodium acetate in 10 ml of water was added dropwise at room temperature over 20 minutes. The reaction mixture was further stirred at the same temperature for 3 hours. The thus obtained reaction mixture was poured onto ice. The reaction mixture was further stirred for one hour. Crystals separated out from the reaction mixture. The crystals were filtered off, recrystallized from 100 ml of toluene, and dried under reduced pressure with the application of heat thereto, whereby 2.18 g of a trisazo compound No. II-1 according to the present invention was obtained in the form of green powder in a yield of 70%.

Figure 4:
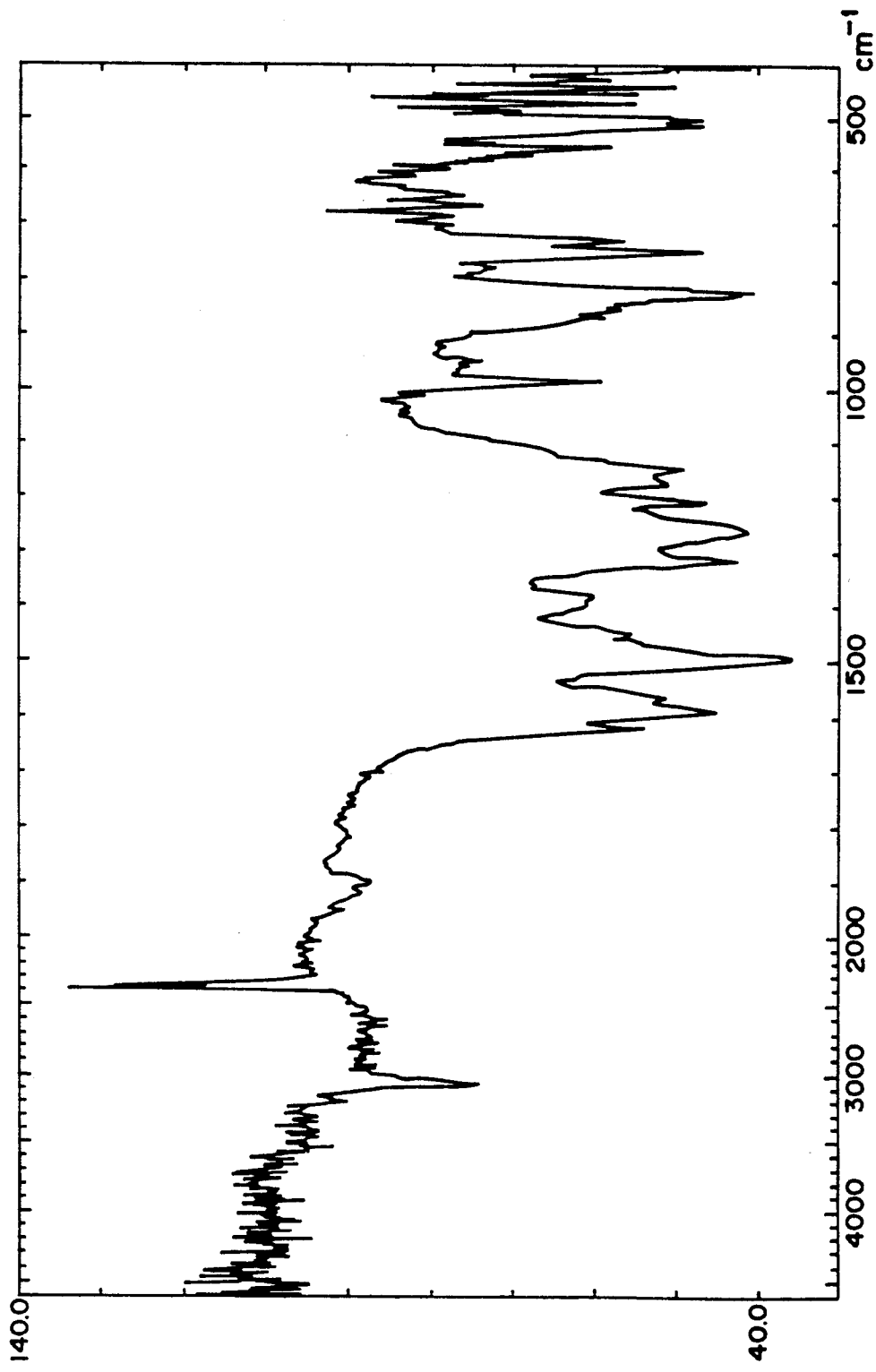
FIGS. 4 and 5 respectively are the charts of infrared spectrums (KBr) of trisazo compounds No. II-1 and No. II-2 according to the present invention.

FIG. 4 shows an infrared spectrum (by use of KBr tablet) of the above obtained trisazo compound No. II-1.

EXAMPLE II-3

[Preparation of Trisazo Compound No. II-2]

2.16 g (0.013 mol) of m-N,N-diethylaminophenol was dissolved in 100 ml of DMF to obtain a solution. The solution was cooled to 3° C. using ice bath. 2.24 g (0.0038 mol) of the tris(diazonium) salt prepared in Example II-1 was added to the above solution. A solution prepared by dissolving 2.14 g of sodium acetate in 10 ml of water was added dropwise to the above solution over 20 minutes at the same temperature as before, so that a reaction mixture was obtained. The thus obtained reaction mixture was stirred at 4° C. for 2 hours, and poured into iced water. The reaction mixture was further stirred for one hour. Crystals separated out from the reaction mixture. The crystals were filtered off, purified by silica gel column chromatography by use of chloroform as eluent, then recrystallized from 200 ml of ethanol, and dried under reduced pressure with the application of heat thereto, so that 1.51 g of a trisazo compound No. II-2 according to the present invention was obtained in the form of green glossy crystals in a yield of 50%.

Figure 5:
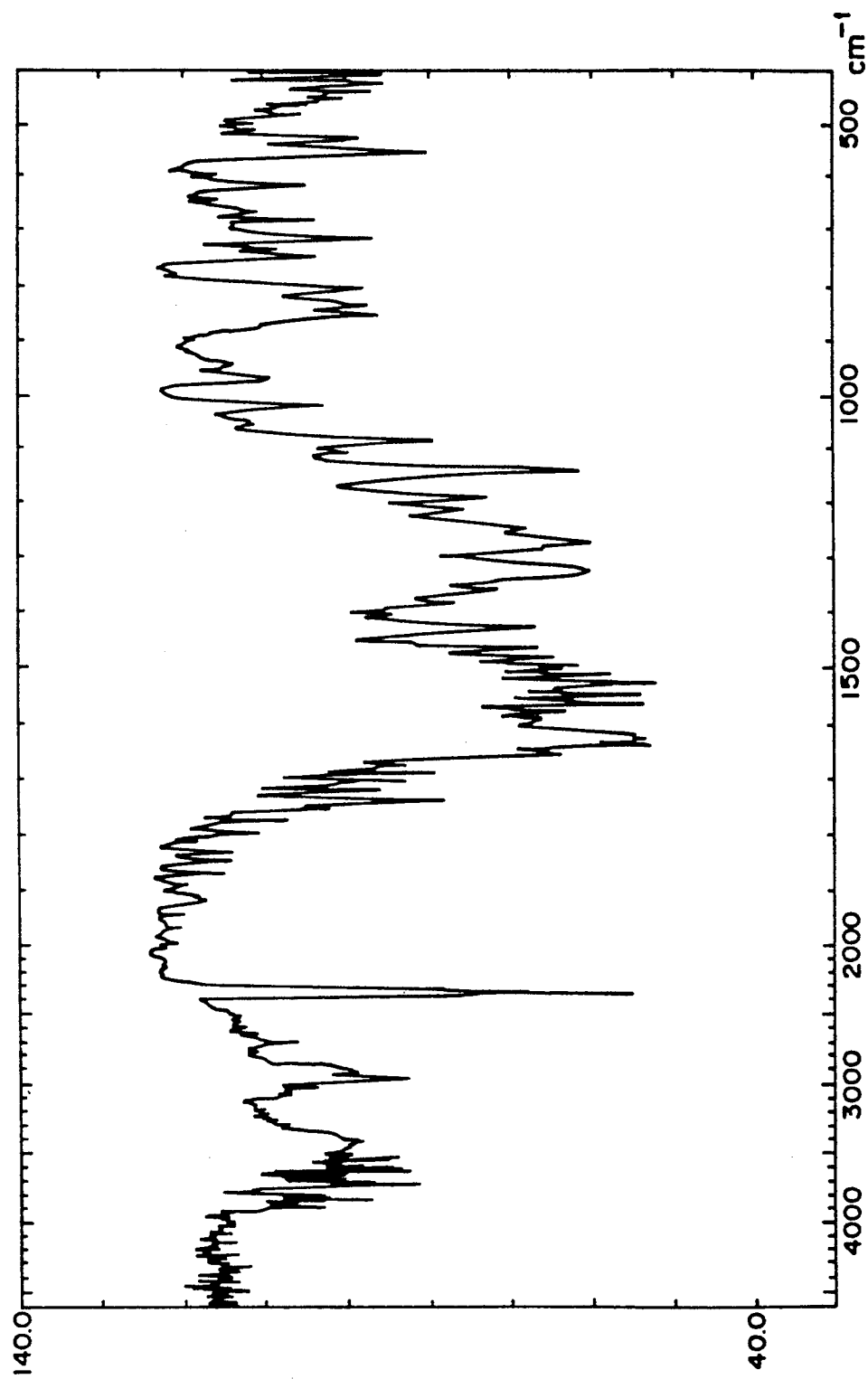

FIG. 5 shows an infrared spectrum (by use of KBr tablet) of the above obtained trisazo compound No. II-2.

EXAMPLES II-4 to II-8

[Preparation of Trisazo Compounds No. II-3 to No. II-7]

The procedure for preparation of the trisazo compound No. II-1 in Example II-2 was repeated except that the coupler employed in Example II-2 was replaced by the respective corresponding couplers shown in Table 4, so that trisazo compounds No. II-3 to No. II-7 were respectively obtained.

Table 4 shows the melting points or decomposition points, and the results of the elemental analyses of the thus obtained trisazo compounds. Table 5 shows the absorption maximum wavelength, and the molecular absorption coefficient of each of the thus obtained trisazo compounds.

The bisazo and trisazo compounds according to the present invention are useful as the materials for the optical information recording layer of the optical information recording medium because of the excellent solubility, large absorptivity coefficient, and high reflectance thereof.

TABLE 1

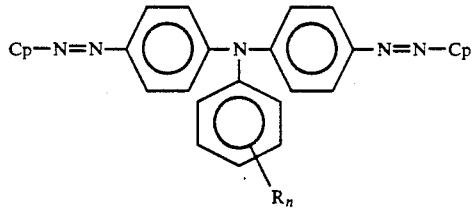

| Compound No. | —R$_n$ | Coupler Residue (Cp) | Melting Point or Decomposition Point (°C.) |
|---|---|---|---|
| I-1 | 4-CN | 2-naphthol with OH | 270 |
| I-2 | 4-CN | phenol with OH, NEt$_2$ | 205 (dec.) |
| I-3 | 4-CN | 2-naphthol with OH, COOMe | 264 |
| I-4 | 4-CN | HO—C$_6$H$_4$—NH—C$_6$H$_5$ | 226 |

TABLE 1-continued

Cp—N=N—⟨ ⟩—N(—⟨ ⟩—N=N—Cp)(—⟨ ⟩—R$_n$)

| Compound No. | —R$_n$ | Coupler Residue (Cp) | Melting Point or Decomposition Point (°C.) |
|---|---|---|---|
| I-5 | 4-CN | Pyridone with Me, OH, NC, N-Et, =O | 337 (dec.) |
| I-6 | 4-H | 1-methyl-2-hydroxynaphthalene | 260 |
| I-7 | 4-CN | 2-methyl-3-hydroxy-5-(NEt$_2$)phenyl | 270 (dec.) |
| I-8 | 4-CH$_3$O | 1-methyl-2-hydroxynaphthalene | 139 |
| I-9 | 4-CH$_3$O | 2-methyl-3-hydroxy-5-(NEt$_2$)phenyl | 147 |
| I-10 | 4-CH$_3$O | 1-methyl-2-hydroxy-3-COOMe-naphthalene | 181 |
| I-11 | 4-CH$_3$O | Pyridone with Me, OH, NC, N-Et, =O | 215 |

TABLE 2

| Compound No. | Elemental Analysis Found (Calculated) | | |
|---|---|---|---|
| | C (%) | H (%) | N (%) |
| I-1 | 77.00 | 4.29 | 13.49 |
| | (76.71) | (4.29) | (13.76) |
| I-2 | 71.57 | 5.79 | 16.93 |
| | (71.76) | (6.18) | (17.16) |
| I-3 | 71.45 | 4.04 | 11.34 |
| | (71.07) | (4.16) | (11.56) |
| I-4 | 74.18 | 4.43 | 16.02 |
| | (74.55) | (4.66) | (16.18) |
| I-5 | 65.13 | 4.13 | 20.28 |
| | (65.48) | (4.46) | (20.64) |
| I-6 | 78.07 | 4.31 | 11.62 |
| | (77.93) | (4.65) | (11.96) |
| I-7 | 72.41 | 6.43 | 15.30 |
| | (72.70) | (6.58) | (15.62) |
| I-8 | 75.82 | 4.71 | 11.02 |
| | (76.08) | (4.75) | (11.38) |
| I-9 | 70.95 | 6.38 | 14.55 |
| | (71.21) | (6.59) | (14.91) |
| I-10 | 70.21 | 4.61 | 9.38 |
| | (70.58) | (4.55) | (9.57) |
| I-11 | 64.75 | 4.80 | 18.33 |
| | (65.00) | (4.87) | (18.44) |

TABLE 3

| Compound No. | Maximum Absorption λmax (nm) | Molecular Absorptivity Coefficient ε(logε) |
|---|---|---|
| I-1 | 516 | 47000 (4.67) |
| I-2 | 489 | 45000 (4.65) |
| I-3 | 532 | 47000 (4.67) |
| I-4 | 490 | 69000 (4.84) |
| I-5 | 499 | 59000 (4.77) |
| I-6 | 538 | 67000 (4.83) |
| I-7 | 513 | 90000 (4.95) |
| I-8 | 418 | 112000 (5.05) |
| | 457 | 114000 (5.02) |
| I-9 | 455 | 116000 (5.06) |
| I-10 | 430 | 88000 (4.94) |
| | 465 | 90000 (4.95) |
| I-11 | 456 | 43000 (4.63) |

TABLE 4

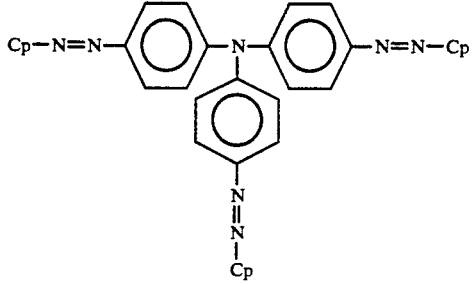

| Compound No. | Coupler Residue (Cp) | Melting Point or Decomposition Point (°C.) | C (%) | H (%) | N (%) |
|---|---|---|---|---|---|
| | | | \multicolumn{3}{c}{Elemental Analysis Found (Calculated)} | | |
| II-1 | 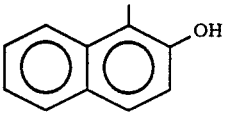 | 267 | 76.58 (76.28) | 4.20 (4.40) | 12.58 (12.97) |
| II-2 | 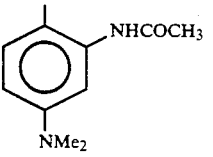 | 142 | 70.57 (70.39) | 6.91 (6.65) | 17.01 (17.10) |
| II-3 | 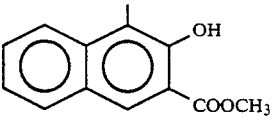 | 147 (dec.) | 66.95 (67.19) | 6.12 (5.99) | 21.10 (21.22) |
| II-4 | 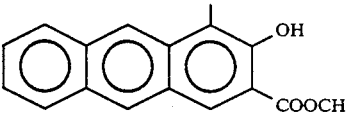 | 316 (dec.) | 69.65 (69.75) | 4.04 (4.23) | 10.29 (10.54) |
| II-5 | 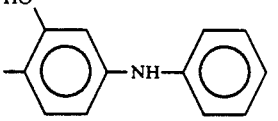 | 278 (dec.) | 73.10 (73.39) | 4.40 (4.20) | 8.87 (9.08) |
| II-6 | 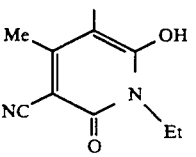 | 218 (dec.) | 73.71 (73.79) | 4.84 (4.82) | 16.67 (15.94) |
| II-7 | | 313 (dec.) | 62.61 (63.00) | 4.56 (4.58) | 21.10 (21.23) |

TABLE 5

| Compound No. | Maximum Absorption λmax (nm) | Molecular Absorptivity Coefficient ε(logε) |
|---|---|---|
| II-1 | 541 | 79000 (4.90) |

TABLE 5-continued

| Compound No. | Maximum Absorption λmax (nm) | Molecular Absorptivity Coefficient ε(logε) |
|---|---|---|
| II-2 | 513 | 126000 (5.10) |

TABLE 5-continued
| Compound No. | Maximum Absorption λmax (nm) | Molecular Absorptivity Coefficient ε(logε) |
| --- | --- | --- |
|  | 543 | 116000 (5.06) |
| II-3 | 514 | 120000 (5.08) |
|  | 537 | 115000 (5.06) |
| II-4 | 555 | 84000 (4.92) |
| II-5 | 605 | 62000 (4.79) |
| II-6 | 513 | 116000 (5.06) |
| II-7 | 548 | 60000 (4.78) |
What is claimed is:
1. A bisazo compound of formula (I):
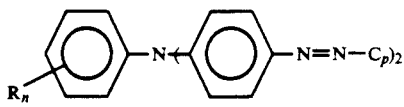
wherein R represents an alkyl group having 1 to 20 carbon atoms and having a phenyl group as a substituent, n is an integer of 1, 2 or 3, and $C_p$ represents a coupler residue.
* * * * *